United States Patent
Fordyce, III et al.

(10) Patent No.: US 11,049,125 B2
(45) Date of Patent: *Jun. 29, 2021

(54) PAYMENT ACCOUNT PROCESSING WHICH CONVEYS FINANCIAL TRANSACTION DATA AND NON-FINANCIAL TRANSACTION DATA

(71) Applicant: Visa U.S.A. Inc., San Francisco, CA (US)

(72) Inventors: Edward W. Fordyce, III, West Gaston, IN (US); Barbara Elizabeth Patterson, South San Francisco, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 62 days.

This patent is subject to a terminal disclaimer.

(21) Appl. No.: 16/508,798

(22) Filed: Jul. 11, 2019

(65) Prior Publication Data

US 2019/0333089 A1 Oct. 31, 2019

Related U.S. Application Data

(63) Continuation of application No. 12/110,914, filed on Apr. 28, 2008, now Pat. No. 10,395,264.

(Continued)

(51) Int. Cl.
*G06Q 30/02* (2012.01)
*G06Q 20/24* (2012.01)
(Continued)

(52) U.S. Cl.
CPC ......... *G06Q 30/0207* (2013.01); *G06Q 20/24* (2013.01); *G06Q 20/387* (2013.01);
(Continued)

(58) Field of Classification Search
CPC .. G06Q 30/0207; G06Q 20/24; G06Q 20/387; G06Q 20/40; G06Q 30/02; G06Q 30/0234; G06Q 30/04; G06Q 40/00
See application file for complete search history.

(56) References Cited

U.S. PATENT DOCUMENTS

| 4,751,374 A | 6/1988 | Nose |
| 5,025,372 A | 6/1991 | Burton et al. |

(Continued)

FOREIGN PATENT DOCUMENTS

| CA | 2680531 A1 | 9/2008 |
| WO | 2001045008 A1 | 6/2001 |

OTHER PUBLICATIONS

Rajagopal, Dr. "Point of sales promotions and buying stimulation in retail stores." Available at SSRN 1261570 (2008). (Year: 2008).*

(Continued)

*Primary Examiner* — Asfand M Sheikh
(74) *Attorney, Agent, or Firm* — The Webb Law Firm

(57) ABSTRACT

A payment processing system enables a consumer to purchase items at a merchant using an account provided by an issuer. Financial data related to payment for the purchase are sent by the merchant through an acquirer and a transaction expeditor to the issuer. The issuer responds by determining whether to authorize the purchase and if authorized, sends a notification back to the merchant. The acquirer also issues non-financial data that is conveyed by the transaction expeditor to a recipient connected to the payment processing system. The financial and non-financial data for the same transaction may be sent in separate messages and a technique is provided for matching those messages at the recipient. Different types of non-financial data can be conveyed, such as identification of the items being purchased which the recipient uses to determine whether the consumer should (Continued)

| ISSUER BIN/RANGE | MERCHANT CATEGORY CODE | TRANSACTION TYPE | CHANNEL | MERCHANT IDENTIFIER | JURISDICTION |
|---|---|---|---|---|---|
| 411111999 | 5542 | | | 11111 | 840+124 |
| 411111 | | PAYMENT | FACE TO FACE | 11111 (LIMITS TRANSACTION TO SPECIFIC MERCHANT) | |
| 412513888 | | | | 12513 | 840 | receive a reward under a product purchase incentive program.

19 Claims, 6 Drawing Sheets

Related U.S. Application Data

(60) Provisional application No. 60/915,079, filed on Apr. 30, 2007.

(51) Int. Cl.
  *G06Q 20/40* (2012.01)
  *G06Q 30/04* (2012.01)
  *G06Q 20/38* (2012.01)
  *G06Q 40/00* (2012.01)

(52) U.S. Cl.
  CPC ............. *G06Q 20/40* (2013.01); *G06Q 30/02* (2013.01); *G06Q 30/0234* (2013.01); *G06Q 30/04* (2013.01); *G06Q 40/00* (2013.01)

(56) References Cited

U.S. PATENT DOCUMENTS

| | | |
|---|---|---|
| 5,471,669 A | 11/1995 | Lidman |
| 5,495,412 A | 2/1996 | Thiessen |
| 5,689,100 A | 11/1997 | Carrithers et al. |
| 5,734,838 A | 3/1998 | Robinson et al. |
| 5,855,008 A | 12/1998 | Goldhaber et al. |
| 5,945,653 A | 8/1999 | Walker et al. |
| 6,009,411 A | 12/1999 | Kepecs |
| 6,014,635 A | 1/2000 | Harris et al. |
| 6,061,660 A | 5/2000 | Eggleston et al. |
| 6,105,001 A | 8/2000 | Masi et al. |
| 6,222,914 B1 | 4/2001 | McMullin |
| 6,332,126 B1 | 12/2001 | Peirce et al. |
| 6,405,174 B1 | 6/2002 | Walker et al. |
| 6,694,300 B1 | 2/2004 | Walker et al. |
| 6,876,971 B1 | 4/2005 | Burke |
| 6,937,995 B1 | 8/2005 | Kepecs |
| 6,965,868 B1 | 11/2005 | Bednarek |
| 7,219,071 B2 | 5/2007 | Gallagher |
| 7,318,049 B2 | 1/2008 | Iannacci |
| 7,392,224 B1 | 6/2008 | Bauer et al. |
| 7,398,225 B2 | 7/2008 | Voltmer et al. |
| 7,433,845 B1 | 10/2008 | Flitcroft et al. |
| 7,490,058 B2 | 2/2009 | Dan et al. |
| 7,665,660 B2 | 2/2010 | Degliantoni et al. |
| 7,844,490 B2 | 11/2010 | Patterson |
| 8,103,545 B2 | 1/2012 | Ramer et al. |
| 8,620,738 B2 | 12/2013 | Fordyce, III et al. |
| 8,645,282 B2 * | 2/2014 | Vakil .................. G06Q 20/3823 705/76 |
| 8,781,893 B2 | 7/2014 | Walker et al. |
| 9,721,238 B2 * | 8/2017 | Salmon ................ G06Q 20/387 |
| 10,318,980 B2 * | 6/2019 | Crowe ................ G06Q 30/0226 |
| 10,783,544 B1 * | 9/2020 | Stringfellow .......... G06Q 20/24 |
| 2001/0054003 A1 * | 12/2001 | Chien .................... G06Q 20/10 705/14.17 |
| 2002/0002533 A1 | 1/2002 | Singhal |
| 2002/0013728 A1 * | 1/2002 | Wilkman ............... G06Q 30/02 705/14.53 |
| 2002/0013765 A1 | 1/2002 | Shwartz |
| 2002/0077969 A1 | 6/2002 | Walker et al. |
| 2002/0120588 A1 | 8/2002 | Preist et al. |
| 2002/0143626 A1 | 10/2002 | Voltmer et al. |
| 2003/0028451 A1 | 2/2003 | Ananian |
| 2003/0033211 A1 | 2/2003 | Haines et al. |
| 2003/0061097 A1 * | 3/2003 | Walker ................ G06Q 30/0222 705/14.13 |
| 2003/0088462 A1 | 5/2003 | Carrithers et al. |
| 2003/0130895 A1 | 7/2003 | Antonucci et al. |
| 2003/0149623 A1 | 8/2003 | Chen |
| 2003/0216967 A1 | 11/2003 | Williams |
| 2003/0236712 A1 * | 12/2003 | Antonucci ......... G06Q 30/0268 705/14.3 |
| 2004/0019522 A1 | 1/2004 | Bortolin et al. |
| 2004/0068435 A1 | 4/2004 | Braunzell |
| 2004/0133504 A1 | 7/2004 | Dalal |
| 2004/0210481 A1 | 10/2004 | Quinlan et al. |
| 2004/0215543 A1 | 10/2004 | Betz et al. |
| 2004/0251305 A1 * | 12/2004 | Klapka .................. G06Q 30/02 235/383 |
| 2004/0254848 A1 | 12/2004 | Golan et al. |
| 2005/0004836 A1 | 1/2005 | Ruttenberg |
| 2005/0004839 A1 | 1/2005 | Bakker et al. |
| 2005/0010470 A1 | 1/2005 | Marino |
| 2005/0021399 A1 | 1/2005 | Postrel |
| 2005/0021400 A1 | 1/2005 | Postrel |
| 2005/0071227 A1 | 3/2005 | Hammad et al. |
| 2005/0109833 A1 | 5/2005 | Page |
| 2005/0177750 A1 | 8/2005 | Gasparini et al. |
| 2005/0203966 A1 | 9/2005 | Labrou et al. |
| 2005/0240477 A1 | 10/2005 | Friday et al. |
| 2005/0240552 A1 | 10/2005 | Levanoni |
| 2005/0267842 A1 | 12/2005 | Weichert et al. |
| 2005/0289001 A1 | 12/2005 | Pamau |
| 2006/0000900 A1 | 1/2006 | Fernandes et al. |
| 2006/0085357 A1 | 4/2006 | Pizarro |
| 2006/0111978 A1 | 5/2006 | Tietzen et al. |
| 2006/0195359 A1 | 8/2006 | Robinson et al. |
| 2006/0206376 A1 * | 9/2006 | Gibbs .................... G06Q 30/02 705/14.13 |
| 2006/0208064 A1 | 9/2006 | Mendelovich et al. |
| 2006/0208065 A1 | 9/2006 | Mendelovich et al. |
| 2006/0224454 A1 | 10/2006 | Kantor et al. |
| 2006/0253320 A1 | 11/2006 | Heywood |
| 2006/0253321 A1 | 11/2006 | Heywood |
| 2007/0000996 A1 * | 1/2007 | Lambert ............... G06Q 20/387 235/380 |
| 2007/0000997 A1 * | 1/2007 | Lambert ............ G06Q 30/0238 235/380 |
| 2007/0001016 A1 | 1/2007 | Hunter et al. |
| 2007/0005416 A1 * | 1/2007 | Jackson .................. G06Q 30/02 705/14.15 |
| 2007/0005427 A1 | 1/2007 | Walker et al. |
| 2007/0022007 A1 | 1/2007 | Lawe |
| 2007/0022048 A1 | 1/2007 | Kingsborough et al. |
| 2007/0094080 A1 | 4/2007 | Wiken |
| 2007/0150352 A1 | 6/2007 | Kelly-Frank et al. |
| 2007/0185821 A1 | 8/2007 | Wells et al. |
| 2007/0214049 A1 | 9/2007 | Postrel |
| 2007/0255653 A1 | 11/2007 | Tumminaro et al. |
| 2007/0265934 A1 | 11/2007 | Hassman et al. |
| 2007/0282690 A1 | 12/2007 | Randazza et al. |
| 2008/0010154 A1 | 1/2008 | Tietzen et al. |
| 2008/0033793 A1 * | 2/2008 | Roberts ............... G06Q 30/0235 705/14.35 |
| 2008/0059302 A1 | 3/2008 | Fordyce III et al. |
| 2008/0059303 A1 | 3/2008 | Fordyce |
| 2008/0059306 A1 | 3/2008 | Fordyce et al. |
| 2008/0059307 A1 | 3/2008 | Fordyce, III et al. |
| 2008/0114657 A1 | 5/2008 | Forzley |
| 2008/0133351 A1 | 6/2008 | White et al. |
| 2008/0154676 A1 | 6/2008 | Suk |
| 2008/0228582 A1 | 9/2008 | Fordyce et al. |
| 2009/0089194 A1 | 4/2009 | Mathis et al. |
| 2009/0171778 A1 | 7/2009 | Powell |
| 2009/0259560 A1 | 10/2009 | Bachenheimer |
| 2010/0169170 A1 | 7/2010 | Fordyce et al. |
| 2011/0004514 A1 | 1/2011 | Thomas |
| 2011/0137716 A1 * | 6/2011 | Reuthe ................ G06Q 30/0215 705/14.17 |
| 2012/0311617 A1 | 12/2012 | Walker et al. |
| 2015/0154646 A1 * | 6/2015 | Mishra .................. G06Q 30/06 705/3 |
| 2018/0308105 A1 * | 10/2018 | Fordyce, III ........... G06Q 30/02 |
| 2020/0082427 A1 * | 3/2020 | Gleeson ............ G06Q 30/0215 |
| 2020/0134657 A1 * | 4/2020 | Darmo ............... G06Q 30/0236 |

(56) References Cited

OTHER PUBLICATIONS

Saranow et al., "Proclamation points reward!: For spending cash at dealership or using automaker's credit card accumulate points and use toward services or vehicle purchase", Chicago Sun-Times, Jun. 4, 2006, 2 pgs.

* cited by examiner

| ISSUER BIN/RANGE | MERCHANT CATEGORY CODE | TRANSACTION TYPE | CHANNEL | MERCHANT IDENTIFIER | JURISDICTION |
|---|---|---|---|---|---|
| 411111999 | 5542 | | | 11111 | 840+124 |
| 411111 | | PAYMENT | FACE TO FACE | 11111 (LIMITS TRANSACTION TO SPECIFIC MERCHANT) | |
| 412513888 | | | | 12513 | 840 |

Fig. 12

PAYMENT ACCOUNT PROCESSING WHICH CONVEYS FINANCIAL TRANSACTION DATA AND NON-FINANCIAL TRANSACTION DATA

CROSS-REFERENCE TO RELATED APPLICATIONS

This application is a continuation application of U.S. patent application Ser. No. 12/110,914, filed Apr. 28, 2008, which claims benefit of U.S. Provisional Patent Application No. 60/915,079, filed on Apr. 30, 2007, the disclosures of which are hereby incorporated by reference in their entireties.

FIELD OF THE INVENTION

The present invention generally relates to exchanging financial and non-financial transaction data within a payment processing system, such as one for processing credit and debit card transactions; and more particularly to incentive programs in which consumers are rewarded for purchasing specific goods or services with a portable payment device, such as a credit card, a debit card, or prepaid transaction card.

BACKGROUND OF THE INVENTION

It is typical for a particular store to have a spend-and-get incentive program in which a program card is given to a consumer. One example of a spend-and-get incentive program is where each time a consumer makes a purchase at that store, either any purchase or the purchase of a specific product, a salesperson punches a hole in the card. After a given number of holes have been punched, the card can be redeemed for a reward, such as a free product. This type of incentive program requires that the consumer bring the card into the store each time a purchase is made and requires that the consumer remembers to present the card to the salesperson. In addition, this program is limited to a particular store or a chain of stores.

A punch card incentive program is not easily implemented when the manufacturer of a product desires to reward consumers who buy a given quantity of that product regardless of the store or stores at which the purchases occur. For that type of reward the consumer usually has to remove a proof of purchase indicium from each product and mail the indicia along with a redemption form to the manufacturer or a clearing house representing the manufacturer. Several weeks later, the consumer then receives a reward in the mail, such as merchandise, a rebate bank check, or a rebate coupon. A rebate coupon must be taken to a store for redemption.

Consumers often pay merchants for goods and services using a payment card account associated with a payment processing system, such as those systems under the general operation of various well-known 'credit card companies', for instance, American Express®, Diner's Club®, Discover Card, etc Visa®, etc. For example, the account may be part of a credit card program, a debit card program, a flexible spending account (FSA) program, or a commercial card program having predetermined goods or services for which the account can be used, and/or a loyalty program some of which have having credit limits and other use restrictions. These processing systems handle transactions occurring at a large number of merchants located around the world.

The transaction with a merchant begins with the consumer presenting account information, such as a credit card account number, to the merchant to initiate payment for a product or service. The merchant communicates within the payment processing system to exchange transaction data, such as the account number, merchant identification code, and transaction value, in order to have the payment card transaction authorized, cleared, and settled. The data are exchanged over a communication network in one or more messages that may have predefined formats.

Some account holders in these payment processing systems can be rewarded based on the monetary amounts of their purchases. For example, for every dollar spent, an account holder may receive points redeemable for airline tickets and other goods and services. Other account holders may receive a percentage of the aggregate purchase amounts as a rebate credit to the account. Nevertheless, conventional payment processing systems heretofore were not easily adaptable for spend-and-get incentive programs involving unaffiliated stores and specific name brand products.

SUMMARY OF THE INVENTION

A payment processing system includes a transaction expeditor that processes a plurality of financial transactions, each characterized by a consumer and a merchant engaging in a given financial transaction upon a payment account issued to the consumer by an issuer within the payment processing system. The merchant submits the given financial transaction to an acquirer for processing by the transaction expeditor, which requests the issuer to disburse funds from the consumer for the given financial transaction. The issuer sends the funds to the transaction expeditor which forwards the funds to the acquirer to disburse the funds to the merchant for the given financial transaction.

The payment processing system executes a computer-implemented method in which the acquirer issues financial transaction data related to a purchase of an item by the consumer at a merchant. The transaction expeditor conveys the financial transaction data from the acquirer to the issuer. In response to receiving the financial transaction data, the issuer determines whether to authorize the purchase of the item using the account issued to the consumer. Typically upon the issuer authorizing a purchase, a notification of that fact is sent back through the payment processing system to the acquirer and/or the associated merchant.

The acquirer also issues non-financial transaction data which is not required for authorization to use a payment account for a purchase. That non-financial transaction data is conveyed by the transaction expeditor to a recipient connected to the payment processing system.

The payment processing system and the method that is executed are particularly suited for processing non-financial transaction data related to a product purchase incentive program. For this application, the non-financial transaction data includes an identifier that designates the item being purchased. If purchase of the item is authorized, the recipient determines whether the purchase qualifies the consumer for a reward based on incentive program rules. The issuer may provide those incentive program rules to the recipient, which in this case is known as the loyalty program processor. The recipient also may notify the acquirer or the merchant when the consumer is entitled to a reward. Rewards include a discount, credit, a product or service, an event, an experience (such as wine tasting, dining, travel), or any item of value.

Other forms of non-financial transaction data can be conveyed by the payment processing system. For example, the process enables a merchant to query the account issuer for the account number issued to a consumer who, though wanting to conduct a transaction on the account, has forgotten to bring the payment card associated with the account. A merchant also may query the account issuer for personal information about a consumer or for the amount of credit available for use by the consumer. The payment processing system further can be employed to process a payment account application received by a merchant from a consumer. In this situation, the merchant sends information from the payment account application through the acquirer and the transaction expeditor to an issuer that is being requested to provide a payment account to that consumer. After evaluating the application, the issuer replies to the merchant with a message approving or denying the payment account application. A message with an account approval may contain the number of the new account, thereby enabling the consumer to use that account immediately at the merchant.

BRIEF DESCRIPTION OF THE DRAWINGS

Implementations of the invention will become more apparent from the detailed description set forth below when taken in conjunction with the drawings, in which like elements bear like reference numerals.

FIG. 12 illustrates an exemplary limited acceptance function.

DESCRIPTION OF THE INVENTION

The present concept has particular application to processing data related to an incentive program that offers rewards to consumers who use a portable payment device to purchase specific products or services as defined by program rules. A given incentive program may be sponsored by a merchant, such as a store chain, a manufacturer or distributor of a brand of products, or an issuer of the portable payment device. For example, a loyalty type incentive program may have a spend-and-get rule, wherein the tenth purchase of a particular product results in the eleventh purchase of that product being free. To illustrate, Walgreens® retail stores may have a nationwide spend-and-get promotion which encourages a consumer to use a particular type of credit card to purchase Orville Redenbacher's® popcorn. The credit card is a co-branded Walgreens®-Wells Fargo® Bank credit card. When a consumer uses that type of credit card to make the eleventh purchase of Orville Redenbacher's® popcorn, the Walgreens® store either does not charge the consumer for the purchase or the consumer receives a credit for the price of the popcorn on his or her credit card statement.

Other incentive programs are offered to only select consumers, such as those spending more than a certain amount each month. Those consumers may be eligible for a given amount (e.g. $10.00 US) off a purchase that exceeds a predefined amount (e.g. $100.00 US). Another incentive program may inform selected consumers that, if they purchase a particular item, such as a mattress, they will receive another item, such as a bed spread, free. These various incentive programs have specific rules that must be satisfied before a consumer can get the reward. Examples of such rules are a rule limiting the reward to a list of people to whom the program is available, a rule that the consumer has to purchase a particular product or a given quantity of a particular product to be rewarded, or a rule that the consumer must use a specific type of portable payment device to be rewarded.

First Payment Processing System Implementation

Figure 1:
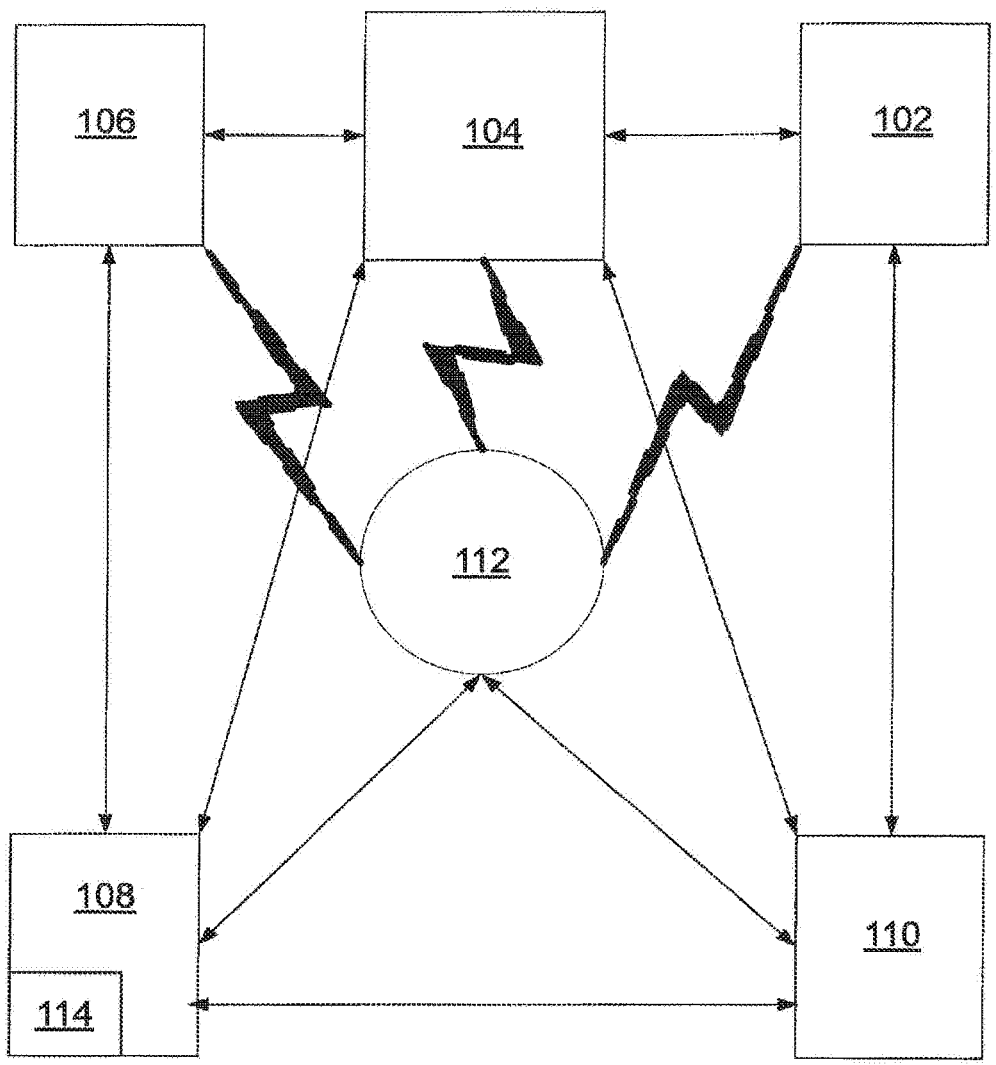
FIG. 1 is a block level diagram illustrating an exemplary payment processing system.

A general discussion of a payment processing system will now be presented. FIG. 1 depicts a first payment processing system 100 for processing a financial transaction that involves participation from different entities and which has been enhanced to process data for an incentive program. The first payment processing system 100 includes an issuer 102, a transaction handler 104, an acquirer 106, a merchant 108, and a consumer 110, such as an account holder. The merchant 108 may be a person or business that sells goods or services, for instance a retailer, a manufacturer, a wholesale distributor, a restaurant, or a medical facility. In a business-to-business setting, the consumer 110 may be another merchant making a purchase from the merchant 108. Therefore, a consumer or account holder includes any person or entity with an account and/or a payment device associated with an account, where the account is within a payment system. The acquirer 106 and the issuer 102 can be different entities or the same entity, but in either case the financial transaction is processed through the transaction handler 104. The issuer 102 typically is a bank or other financial institution, that issued a payment account and/or a portable payment device 112, such as a credit or debit card, to the consumer 110; and the acquirer 106, also typically is a bank or other financial institution, that has a payment processing agreement with the merchant 108. The transaction handler 104 may be a credit card company, such as Visa®. It should be understood that the transaction handler 104 is connected to a large number of acquirers and issuers and handles the exchange of financial transaction data among them.

Payment processing systems of this type are used to clear and settle purchase transactions that are made using a portable payment device. Clearing includes the exchange of financial information between the issuer 102 and the acquirer 106, and settlement comprises the exchange of funds.

Figure 2:
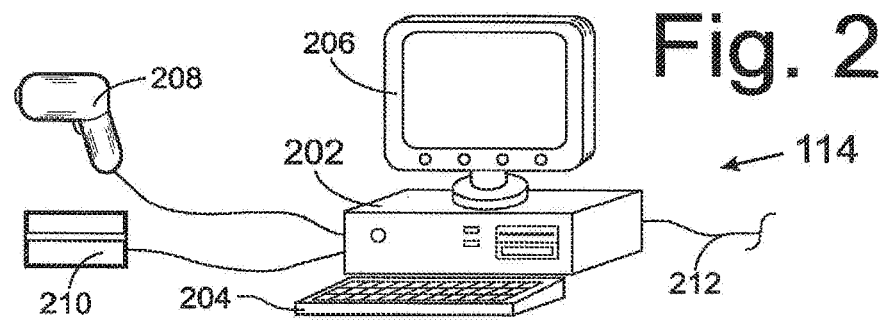
FIG. 2 is a representation of a point of sale terminal that is part of a merchant in the payment processing system.

Often, a transaction begins with the consumer 110 contacting the merchant to acquire a product or service. For example in a retail store, the consumer places one or more products on a counter adjacent a point of sale (POS) terminal 114, such as a cash register. With reference to FIG. 2, an exemplary point of sale (POS) terminal 114 comprises a processing unit 202 to which a keyboard 204, a computer display 206, a optical scanner 208 for merchandise, and a payment device scanner 210 are connected. The processing unit 202 is connected to the acquirer 106 by a communication link, such as a telephone line or the Internet. Other types of point of sale terminals include a cellular phone, personal digital assistant (PDA), personal computer, tablet computer, handheld specialized reader, set-top box, electronic cash register (ECR), automated teller machine (ATM), virtual cash register (VCR), kiosk, security system, or access system.

Then an employee of the merchant uses the optical scanner 208 to read a product identifier, such as a Stock Keeping Unit (SKU) number, Universal Product Code (UPC) number and the like, on the package of each product. In other situations, the employee types the product or service identifier into a keyboard 204. As used herein, the term "product" includes a service or a product, and a "product identifier" may identify a service or a product. The product identifiers enable the POS 114 to query a storage device to obtain the price of each product and calculate the total amount of the purchase.

Then the consumer 110 presents a portable payment device 112 to merchant 108 to pay for purchasing the product or service. As used herein, the portable payment device 112 can be a payment card, a gift card, a smartcard, a smart media, a payroll card, a health care card, a wrist band, a machine readable medium containing account information, a keychain device such as a SPEEDPASS® device commercially available from ExxonMobil Corporation or a supermarket discount card, a cellular phone, personal digital assistant (PDA), a pager, a security card, an access card, a substrate bearing an optically scanable data region, a wireless terminal, or a transponder. The portable payment device 112 may include a volatile or non-volatile memory to store information such as the account number or an account holder's name. The term "portable payment device" as used herein does not include money and checks.

The POS 114 obtains account information, such as an account number and account holder's name, from the portable payment device 112. The portable payment device 112 interfaces with the POS 114 using the payment device scanner 210 that employs any suitable electrical, magnetic, or optical mechanism. In addition to the account information read from the portable payment device 112, the POS 114 also generates other financial transaction data, including the monetary amount of the purchase, tax amount, date and time of transaction, the identity of the merchant, and a transaction identification code. The transaction identification code may be an alphanumerical code, characters (e.g., Chinese character), symbols (e.g., §), a hashed value, or combinations thereof. The transaction identification code may be randomly assigned to each new transaction or the transaction identification code may reflect characteristics of the transaction such as time, date, merchant identification code, location of merchant, or combinations appended together (e.g., 10311968555—Oct. 31, 1968 and merchant code 555).

The merchant 108 may utilize the Point Of Service terminal (POS) 114 to communicate the transaction data to the acquirer 106, and optionally the transaction handler 104 and/or the issuer 102. All the financial transaction data related to payment for the products or services and the non-financial transaction data identifying the products to services are incorporated by the POS 114 into a transaction authorization request. In one alternative implementation, the transaction authorization request can be sent as a single message to the acquirer 106 associated with that merchant 108. The acquirer 106 forwards the transaction authorization request to the transaction handler 104 which determines the issuer 102 from a portion of the account number. The transaction handler 104 then sends the transaction authorization request to the issuer 102 of the portable payment device 112.

Upon receiving the financial transaction data, the issuer 102 uses business rules to determine whether to approve or decline the transaction authorization request. The business rules are instructions or guidelines that specify conditions, such as the consumer not exceeding a credit limit, which must be satisfied in order for the request to be approved. The business rules can be set by the consumer 110, the merchant 108, the acquirer 106, the issuer 102, the transaction handler 104, another financial institution, or combinations thereof. After making the approval determination, the issuer 102 sends a reply message through transaction handler 104 and the acquirer 106 to the merchant 108 indicating approval or denial of the transaction authorization request. Alternatively, the transaction handler 104 may authorize, or clear, the purchase transaction. In either situation, the transaction handler 104 may maintain a log or history of approved transaction authorization requests. Upon receiving a reply message approving the transaction authorization request, the merchant 108 records the approval and delivers the product or service to the consumer 110.

The merchant 108 may, at discrete periods, such as the end of the day, submit a list of authorized transactions to the acquirer 106 or other components of the first payment processing system 100 for settlement. The transaction handler 104 may compare the submitted authorized transaction list with its own log of authorized transactions. If a match is found, the transaction handler 104 routes authorization transaction amount requests from the corresponding acquirer 106 to the corresponding issuer 102 involved in each transaction. Upon receiving payment of the authorized transaction amount from the issuer 102, the acquirer 106 forwards the payment to merchant 108 after deducting any transaction costs and fees. If the transaction involves a debit or pre-paid card, the acquirer 106 may choose not to wait until payment is received before to paying the merchant 108.

There may be intermediate steps in the foregoing process, some of which may occur simultaneously. For example, the acquirer 106 can initiate the clearing and settlement process, which results in payment to the acquirer 106 for the amount of the transaction. The acquirer 106 may request from the transaction handler 104 that the transaction be cleared and settled.

The transaction handler 104 can provide services in connection with settlement of the transaction, i.e. the exchange of funds. The settlement of a transaction involves the issuer 102 depositing an amount of the transaction settlement from a first clearinghouse, such as a bank, which the issuer 102 typically chooses, into a settlement house, such as a settlement bank, typically chosen by the transaction handler 104. Then the amount of the transaction settlement is transferred from the settlement house into a second clearinghouse, such as a bank that the acquirer 106 typically chooses, from which the amount is deposited into the merchant's account. Thus, a typical transaction involves numerous entities to request, authorize, and fulfill processing the transaction.

The present concept involves transmitting financial transaction data and non-financial transaction data through a payment processing system and can be performed by one of several Implementations. Financial transaction data is defined as the data related to the payment for goods and services and non-financial transaction data is other data than that which is required for the payment for goods and services. For example, the non-financial transaction data may be required by an product purchase incentive program, or data unrelated to product purchases, for example, patient record data sent between medical facilities.

The previously described functions for payment of commercial transactions that involve a portable payment device are exemplary of prior payment processing systems. However, the first payment processing system 100 further includes novel enhanced authorization functionality which enables non-financial transaction data to be processed by the payment processing systems. The non-financial transaction data may be related to incentive programs that encourage consumers to purchase certain products or services for which rewards will be issued. Either the transaction handler 104 or the issuer 102 can be configured to process the financial and non-financial transaction data to determine whether the consumer is participating in an established incentive program and if so, whether the present purchase is applicable to that program. That configured entity is referred to as the "program processor." These determinations are based on program rules defined by the entity that is operating the incentive program, wherein those program rules are stored in the processing computers at the program processor, the transaction handler 104 or the issuer 102. The program processor applies the program rules to the financial and non-financial transaction data for the transactions, and updates the consumer's incentive program file accordingly. For example, if the present transaction indicates that the consumer is purchasing a package of Orville Redenbacher's® popcorn with a co-branded Walgreens®-Wells Fargo® credit card, then a count in the incentive program file of the number of such packages that this consumer has purchased is incremented by the number of packages in the present transaction. The product identifiers in the non-financial transaction data portion of the transaction authorization request message are used to identify the purchase of Orville Redenbacher's® popcorn and the account number specifies the type of portable payment device that was used.

When the present transaction is part of an incentive program, the program rules also are reviewed by the program processor to determine whether the consumer now qualifies for a reward, for example whether ten packages of Orville Redenbacher's® popcorn now have been purchased entitling the consumer to a free package of popcorn. If qualifying for a reward, the data in the consumer's incentive program file is changed to indicate that reward. In the exemplary program, an indication is placed in the consumer's incentive program file that the next package of Orville Redenbacher's® popcorn will be free. If the present purchase qualifies as the free one, a message to that effect may be sent back to the merchant 108, which then can inform the consumer, perhaps at later stage, of the free package of popcorn. In this latter instance, the merchant is paid for the value of the free package of popcorn, but either the consumer's payment device account is not charged for that item or if charged, the account also is credited for the value of the free package of popcorn. The program processor then charges the value of the package of popcorn and any incentive program operating fees to an account for the sponsor of the incentive program (e.g., ConAgra Foods, Inc which produces Orville Redenbacher's® popcorn).

In other incentive programs, a message may be transmitted back through the payment processing system 100 to the merchant 108 indicating that this consumer is entitled to a reward directly from the merchant, such as a free bedspread to accompany a mattress purchase. The salesperson at the merchant then dispenses the designated reward.

In the first payment processing system implementation just described, the financial and non-financial transaction data were transmitted through the first payment processing system 100 in the same message. This may not be easily accomplished in an existing financial processing system in which the structure of the message for the financial transaction data has been standardized and cannot be modified for the non-financial transaction data without considerable alteration of the system. Therefore, the financial and non-financial transaction data must be sent in two separate messages in many systems, however a mechanism then has to be provided to match the two messages for the same transaction in order to obtain all the data needed by the incentive program processor.

For example, the merchant may send a first message having the previously defined format that contains the financial transaction data necessary for payment of the purchase. The financial transaction data includes the consumer's account number, the purchase monetary amount, sales tax, and a transaction identification code for the purchase transaction. The transaction identification code may be an alphanumerical code, characters (e.g., Chinese characters), symbols (e.g., &, #, §), a hashed value, or combinations thereof. The transaction identification code may be randomly assigned to each new transaction or the transaction identification code may reflect characteristics of the transaction such as time, date, merchant identification code, location of merchant, or combinations appended together (e.g., 10311968555—Oct. 31, 1968 and merchant code 555). Assume for the present purchase example that the transaction identification code is "AAA123". The second message with the non-financial transaction data also contains the account number and the same transaction identification code (e.g. "AAA123"). In addition, the second message contains data required for the incentive program, such as the product identifier (e.g. SKU or UPC number) for each product being purchased or at least for any purchased products related to any one of the incentive programs that may be in effect at the time of the purchase.

Even with two messages some components of an existing financial processing system may not be capable of handling a message with a product identifier, thus requiring an alternative message transmission path for the non-financial transaction data. As a result, one of several processing system implementations can be utilized.

Second Payment Processing System Implementation

Figure 3:
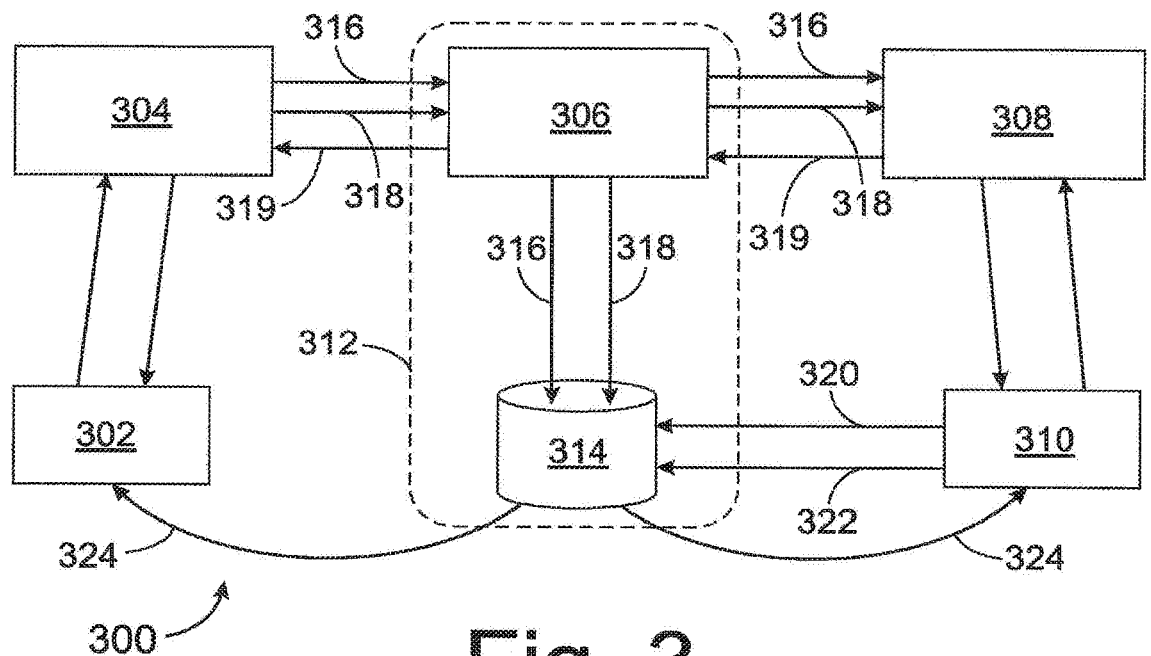
FIG. 3 depicts an exemplary transaction data matching system, wherein a processor matches non-financial and financial transaction data.

With reference to FIG. 3, a second payment processing system 300 comprises a merchant 302, an acquirer 304, a transaction handler 306, a transaction processor 308, and an issuer 310 of a portable payment device. The transaction processor 308 is a component that processes payment transactions for the issuer 310 and may be part of the same financial institution as the issuer or may be a separate entity under contract with the issuer. The transaction handler 306 is part of a transaction expeditor 312 that also includes a qualifier 314. The qualifier 314 has several functions, which include acting as the program processor by determining whether an active incentive program applies to a particular purchase and if so, applying the rules of that program to the purchase, as will be described. Alternatively the qualifier 314 could be a separate entity from the transaction expeditor 312 which functions as the transaction handler 306.

When the consumer makes a purchase and presents a portable payment device, the merchant processes that transaction as described above for the first payment processing system implementation and sends the financial and non-financial transaction data to the associated acquirer 304. That transmission of that data may be in a single message or in multiple messages. The acquirer 304 reformats the data into two separate messages. The first message 316 is in the form of a conventional transaction authorization request that contains the standard financial transaction data related to processing payment for the purchase, and the second message 318 contains the non-financial transaction data related to the items that have been purchased. The merchant may send the product identifier that is a Stock Keeping Unit (SKU) number or other identifier which is unique to that specific merchant. In that case, the acquirer 304 has a table that relates the merchant specific product identifier to a standardized product identifier, such as the Universal Product Code (UPC), for the payment processing system. That standardized product identifier then is inserted into the second message 318. Alternatively the translation of the merchant specific product identifier into a standardized product identifier can be performed by the transaction handler 306, especially for a merchant that has a large number of stores nationwide that utilize a plurality of acquirers.

The acquirer 304 then transmits the first and second messages 316 and 318 to the transaction handler 306. Note that either the first message 316 or the second message 318 may be sent first and the designations of first and second herein do not indicate the order of transmission. In addition, the first message 316 with the payment related financial transaction data may be sent in real time, while the second message 318 containing the non-financial for the same transaction may be aggregated with similar data for other transactions and sent in batch form. The arrows labeled 316 and 318 in FIG. 3 denote the first and second messages, respectively, traveling through the second payment processing system 300.

The transaction handler 306 receives the first and second messages 316 and 318 from the acquirer 304 and functions as a communication facilitator. In that capacity, the transaction handler 306 analyzes a portion of the account number to determine which of the numerous issuers in the worldwide second payment processing system 300 is associated with that payment account. The transaction handler 306 then sends the first and second messages 316 and 318 to the qualifier 314 and to the transaction processor 308. The transaction handler 306 may add other data to those forwarded in the first and second messages 316 and 318.

The transaction processor 308 may also be receiving messages for other financial transactions being handled simultaneously by the transaction handler 306. Therefore, the transaction processor 308 matches the two messages for the same transaction by utilizing various components of the financial or non-financial transaction data. As described above, the transaction identification code can be matched; alternatively the consumer account number, date and time of day, and/or the merchant identification code can be used to distinguish the messages for different transactions and link the first and second messages for each transaction. The message matching links the first message containing the financial transaction data (e.g. the product purchase price) with the second message carrying the non-financial transaction data (e.g. the product identifiers), thereby enabling all the data for each financial transaction to be brought together for further processing.

The merchant identification code distinguishes both the merchant and the transactions involving the merchant, even if there is a lack of uniformity amongst how a financial institution, such as an acquirer 304, logs transactions and logs the association of the transaction with the incentive program. For example, HD hardware store chain has its own incentive program in connection with the issuer 310. The HD hardware store chain may have two franchisee merchants, "HD hardware store X" and "HD hardware store Y", each having different acquirers. Acquirer X may keep an internal transaction log for franchisee merchant HD hardware store X with an identifier "9999" and Acquirer Y may keep a separate internal transaction log for HD hardware store Y with an identifier "WQ83." The single issuer involved in the HD hardware store incentive program may not be able to recognize transaction identifiers "9999" and "WQ83" as associated with HD hardware store chain. Consequently, the issuer may have difficulty determining if purchases at each store qualify for the HD hardware store incentive program. This indistinguishability is further complicated where HD hardware store X banks at both Acquirer X and Acquirer Y and each of which use different merchant identifiers for that store. On the other hand, if the HD hardware store chain assigns unique franchisee codes to each store, the payment processing system is not reliant on the acquirer merchant identifiers and the issuer is able to better distinguish HD hardware store X or HD hardware store Y as participants of the HD hardware store incentive program.

Alternatively in the case of a store chain, the transaction handler 306 which is used by all the acquirers in the second payment processing system 300, can sent the merchant identification code to distinguish the merchant. For example, the transaction handler 306 maintains a merchant identification code for the McDonald's Corporation. The transaction handler may receive transaction messages containing part of the merchant identification code and use that part to distinguish the merchant corresponding to an incentive program. The transaction processor 308 and/or the qualifier 314 may utilize the merchant identifier code to facilitate matching the financial and non-financial transaction data.

In one version of the second payment processing system 300 in FIG. 3, the transaction processor 308 matches the first and second messages 316 and 318 for the each financial transaction. The transaction processor 308 then forwards an enriched record, containing all the matched financial and non-financial transaction data to the issuer 310. The issuer reviews the financial transaction data to determine whether to authorize or decline the financial transaction. A message 319 authorizing or declining the financial transaction then is sent by the issuer 310 back through the second payment processing system 300 to the merchant 302.

The issuer 310 also may send account holder data 320, merchant data 322, and the matched product identification data to the qualifier 314. The account holder data 320 may include the account number, consumer name, and consumer billing address. The merchant data 322 for example includes data that are applicable to an incentive program such as: the program rules, promotion information, promotion codes, and product identifiers for qualifying goods or services. The qualifier 314, acting as the program processor, utilizes the account holder data, the merchant data, and the matched financial and non-financial transaction data to determine if the consumer should receive the benefit of the incentive program as defined by the associated program rules.

Specifically the qualifier 314 matches the non-financial and financial transaction data received from the transaction handler 306, for example by utilizing the transaction identifier code for the transaction. Then the qualifier 314 uses the account holder data and the merchant data sent from the issuer 310 to determine whether the consumer is eligible to participate in an active incentive program based on the various program rules. Some incentive programs are limited to only specified account holders, e.g. high monetary amount spenders. For those incentive programs a determination is made whether the portable payment device account or the consumer name for the current transaction is on a list of program participants. Other programs are open to all persons using a portable payment device or a certain type of device, e.g. a Nordstrom® store privately branded credit card. In the latter case, the account number in the financial transaction data are checked against the list of types of portable payment devices in the program rules. The qualifier 314 also applies other program rules, such as those that designate particular products that qualify for a reward. The qualifier 314 further determines whether the program rules require that a defined quantity of a particular product needs to be purchased in order to qualify for a reward, and if so increments a count of such products purchased by the account holder and determines whether the qualifying quantity has been reached.

Should the transaction corresponding to the matched transaction data qualify for the incentive program, the qualifier 314 can facilitate the implementation of the program (e.g., facilitate the sending of a free bedspread to consumer that purchased a mattress using a Nordstrom® privately branded credit card).

The qualifier 314 also transmits transaction and/or processing fee files 324 related to the incentive program to one or both of: the merchant and the issuer. This notifies the merchant when the customer qualifies for a reward so that the merchant can inform the customer and, if applicable, deliver the reward. The qualifier 314 also may assess a fee for processing the incentive program, wherein a fee may be due from either or both the merchant 302 and the issuer 310. Once the processing fees are determined, messages specifying the fee amounts are sent to the merchant 302 and the issuer 310 as is appropriate. The issuer 310 may true up with the merchant 302 offline for those fees.

Third Payment Processing System Implementation

Figure 4:
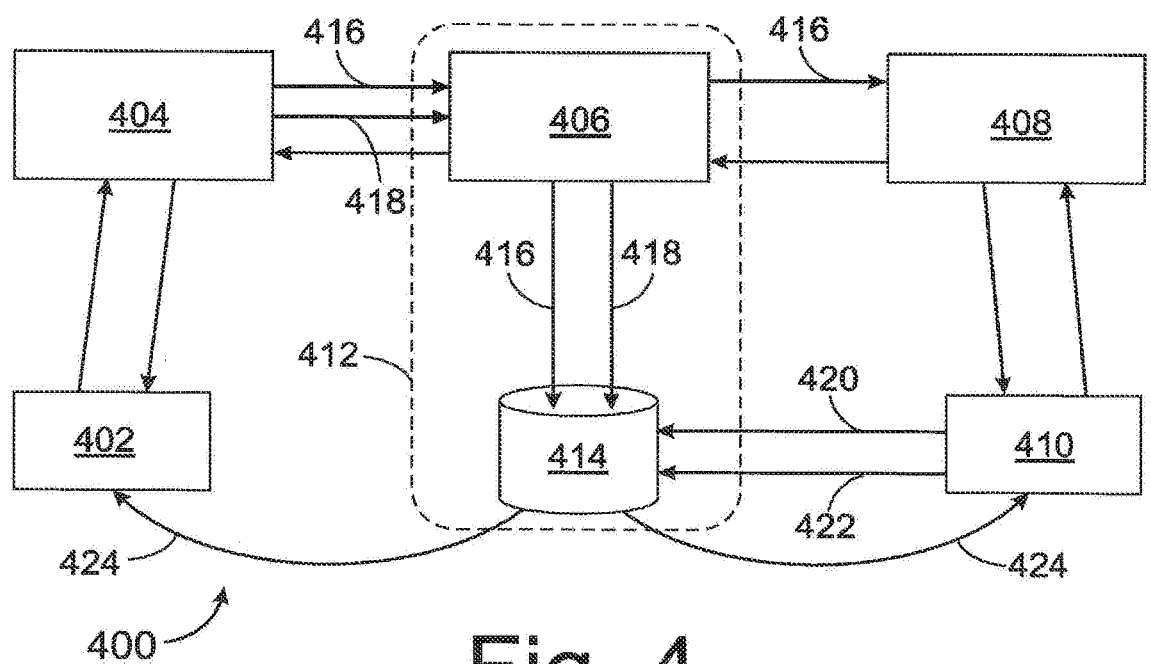
FIG. 4 illustrates an exemplary transaction data matching system wherein another system component matches the non-financial and financial transaction data.

Referring to FIG. 4, an exemplary third payment processing system 400 is depicted that comprises a merchant 402, an acquirer 404, a transaction handler 406, a transaction processor 408, an issuer 410 and a qualifier 414. The transaction handler 406 and the qualifier 414 preferably are part of a transaction expeditor 412. In this implementation, the transaction processor 408 does not match non-financial and financial transaction data in the first and second messages 416 and 418. Instead, only the qualifier 414 performs that data matching, as part of functioning as the program processor.

A consumer having an account within the third payment processing system 400 and being associated with an incentive program goes to the merchant 402 to make a purchase. The merchant 402 sends to the acquirer 404 financial and non-financial transaction data corresponding to a purchase transaction. For example, the merchant may populate fields in a transaction message with payment related data and incentive program data.

Typically the acquirer 404 parses the financial and non-financial transaction data and reformats that data into the defined first and second messages 416 and 418, which are sent to the transaction handler 406. The transaction handler 406 forwards both the first message 416 containing the financial transaction data and the second message 418 containing the non-financial transaction data to the qualifier 414. Only the first message 416 with the standard financial transaction data associated with payment authorization is sent by the transaction handler 406 to the transaction processor 408. Therefore, the transaction processor 408 does not receive the non-financial transaction data associated with the incentive program. For example, the transaction processor 408 may lack the capability to receive the product identifiers or may not have the capability to match the financial and the non-financial transaction data in first and second messages 416 and 418.

The transaction processor 408 forwards the financial transaction data to the issuer 410 which processes the request in that data for payment authorization and sends a corresponding message back to the acquirer 404. In addition, the issuer 410 responds by sending a message that contains the respective transaction identifier code, account holder data 420, and merchant data 422 to the qualifier 414. The account holder data 420 may include the account number associated with the portable payment device that was used at the merchant 402, the consumer's name, and the consumer billing address. The merchant data 422 may include information related to the applicable incentive program, such as: the program rules, promotion information, promotion codes, and the product identifiers for eligible goods and services.

The qualifier 414, acting as the program processor, matches the non-financial and financial transaction data received from the transaction handler 406 by utilizing the transaction identifier code in the associated first and second messages 416 and 418. Then the qualifier 414 uses the account holder data 420 and the merchant data 422 received from the issuer 410 to determine whether the consumer is eligible to participate in an active incentive program based on the program rules. This reward qualification process is the same as used by the qualifier 414 in the second payment processing system 400 described previously. The qualifier 414 then sends a message 424 informing the merchant 402 and the issuer 410 about the incentive program processing results.

Fourth Payment Processing System Implementation

Figure 5:
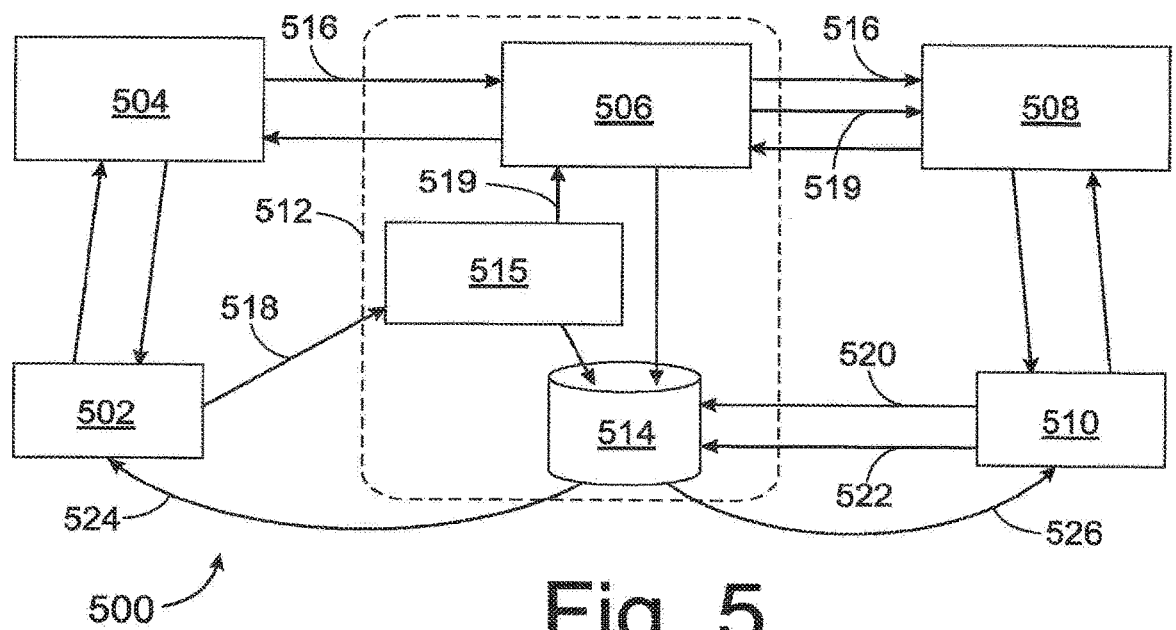
FIG. 5 shows an exemplary transaction data matching implementation, wherein the non-financial and financial transaction data processing utilizes a transaction data repository.

Referring to FIG. 5, an exemplary fourth payment processing system 500 is illustrated that comprises a merchant 502, an acquirer 504, a transaction handler 506, a transaction processor 508, an issuer 510 and a qualifier 514. The transaction handler 506 and the qualifier 514 preferably are part of a transaction expeditor 512. In this implementation, the transaction processor 508 and/or the qualifier 514 matches the non-financial and financial transaction data.

A consumer purchases goods or services at the merchant 502 using a portable payment device in the same manner as described with respect to the previous implementations. In this implementation, the acquirer 504, however, is unable to process non-financial transaction data, such as data related to an incentive program. As a result, the merchant 502 transmits the traditional financial transaction data, associated with the conventional payment clearing process, to the acquirer 504 which incorporates that data into the standard first message 516. That first message 516 then is sent to the transaction handler 506 which uses the account number in the data to identify the particular issuer 510 for that account. The payment clearing process continues with the first message 516 being forwarded through the transaction handler 506 and the transaction processor 508 to the issuer 510. The issuer 510 authorizes or declines payment of this transaction and notifies the merchant 502 accordingly.

In the fourth payment processing system 500, the merchant 502 formats the second message 518 that contains the transaction's non-financial transaction data associated with the incentive program. The second message 518 is sent to a transaction data repository 515 that receives, stores, and forwards the product identifiers for the respective purchase transaction. For example, the transaction data repository 515 may be a database within the transaction expeditor 512 that is accessible by the transaction handler 506. The merchant 502 may send the product identifier as a Stock Keeping Unit (SKU) number or other identifier which is unique to that specific merchant 502. In that case, the transaction data repository 515 has a table that relates the merchant specific product identifier to the standardized product identifier (e.g., a UPC number) for the payment processing system. The transaction data repository 515 then forwards at least some components 519 of the non-financial transaction data to the transaction handler 506 and/or to the qualifier 514. In response, the transaction handler 506 forwards the components 519 of the non-financial transaction data received from the transaction data repository 515 to the transaction processor 508. Thus the transaction processor 508 receives the financial transaction data in the first message 516 and the components 519 of the non-financial transaction data from the second message 518.

Each of the qualifier 514 and the transaction processor 508 may then match the non-financial transaction data and the financial transaction data for the present transaction. The issuer 510 is notified about the current purchase transaction by the transaction processor 508, which notification includes the account number or other data that enables the issuer to identify the respective account holder.

In response to that notification, the issuer 510 sends account holder data 520 and merchant data 522, and optionally the non-financial transaction data and the financial transaction data matched by the processor, to the qualifier 514. The account holder data 520 may include the relevant account number, consumer name, and consumer billing address. The merchant data 522 may include information applicable to the incentive program such as: the program rules, promotion information, promotion codes, and identifiers for the products involved in that incentive program. If the issuer 510 sends to the qualifier 514 each of the financial transaction data and the non-financial transaction data that was matched by the transaction processor 508, then the qualifier 514 may check that matched data against the qualifier's matched financial and non-financial transaction data for the presence of errors and/or for a match confirmation.

As described in detail for the previous implementations, the qualifier 514 then utilizes the account holder data 520, the merchant data 522, and the matched financial and non-financial transaction data to determine whether the consumer is entitled to receive the benefits of the incentive program as defined by the program rules. Should the transaction qualify for the incentive program, the qualifier 514 facilitates the implementation of the program by issuing a reward to the consumer. Such reward issuance can involve mailing a reward item (e.g. a bedspread directly to the consumer), sending a message 524 through the fourth payment processing system 500 instructing the merchant 502 for the current transaction to deliver the reward, such as an item of merchandise or a price discount, to the consumer, or send a different message 526 instructing the issuer 510 to deliver the reward. A reward includes, but is not limited to, any discount, credit, product, service, package, event, experience (such as wine tasting, dining, travel), or any similar item of value.

The qualifier 514 also transmits transaction and/or incentive program processing fee messages 524 to one or both of the merchant 502 and the issuer 510. The issuer 510 may true up with the merchant 502 offline for fees.

Fifth Payment Processing System Implementation

Figure 6:
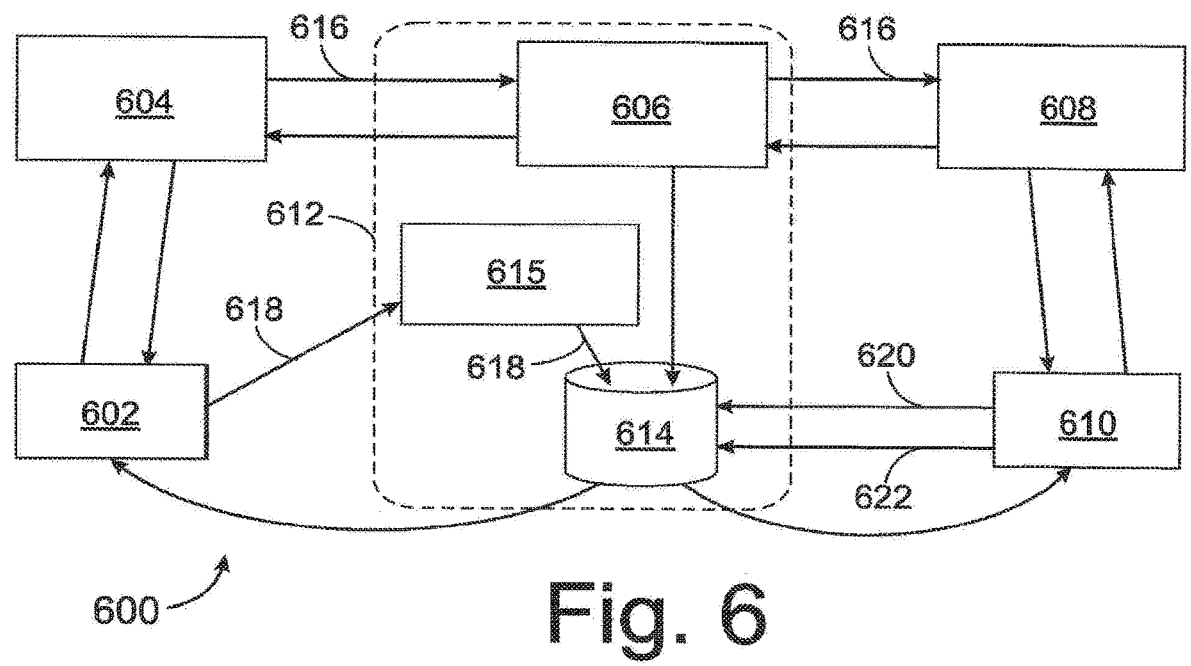
FIG. 6 depicts an alternative implementation that employs a transaction data repository.

With reference to FIG. 6, an exemplary fifth payment processing system 600 is illustrated that comprises a merchant 602, an acquirer 604, a transaction handler 606, a transaction processor 608, an issuer 610, a qualifier 614, and a transaction data repository 615. The transaction handler 606, the qualifier 614, and the transaction data repository 615 preferably are part of a transaction expeditor 612, but one or all of them may be separate entities in communication with each other. In this implementation, the transaction processor 608 and/or the qualifier 614 matches the non-financial and financial transaction data.

With this implementation, a consumer uses a portable payment device to purchase a product at a merchant 602 in the same manner as described for the previous implementations. Now the merchant 602 transmits the traditional financial transaction data, associated with the conventional payment clearing process, in a first message 616 to the acquirer 604 which relays the data to the transaction handler 606. The payment clearing process continues with the first message 616 being forwarded through the transaction handler 606 and the transaction processor 608 to the issuer 610. The issuer 610 authorizes or declines payment of this transaction and notifies the merchant 602 of that result.

In this implementation, the acquirer may not be able to process the non-financial transaction data, such as by separating that data from the financial transaction data and sending the separated data in different messages. As a consequence, the merchant 602 formats the second message 618 that contains the transaction's non-financial transaction data necessary for incentive programs. The second message 618 is sent to a transaction data repository 615 that receives, stores, and forwards the product identifiers and other non-financial transaction data for the respective purchase transaction. Unlike the fourth payment processing system 500, however, the transaction data repository 615 does not send the non-financial transaction data to the transaction handler 606; rather the transaction data repository only sends the non-financial transaction data in the second message 618 to the qualifier 614. In this implementation, the qualifier 614 matches the non-financial transaction data and the financial transaction data associated with each purchase transaction. The qualifier 614 also may receive account holder data 620 and merchant data 622, that includes incentive program rules, from the issuer 610.

The qualifier 614 then utilizes the account holder data, the merchant data and the matched financial and non-financial transaction data to determine if the consumer is entitled to receive the benefit of an incentive program as defined by the program rules. Should the transaction corresponding to the matched data qualify for the incentive program, the qualifier 614 then facilitates the delivery of a reward to which the customer is entitled. The qualifier 614 also transmits transaction and/or incentive program processing fee files 624 to one or both of the merchant 602 and the issuer 610. The issuer 610 may true up with the merchant 602 offline for fees.

The second through fifth implementations vary based in part on parameters such as: which transaction processing component sources the non-financial transaction data, which component matches the non-financial transaction data, and whether the processor is required to have the non-financial transaction data, for example. Other combinations of the parameters can be appreciated and understood by those skilled in the relevant art. Variation of an implementation depends on considerations such as: merchant participation level and acquirer capabilities; an impact that time of delivery of the non-financial transaction data has on the matching processes and subsequent information availability; speed to market—some solutions are more easily implemented; and expenses for acquiring and matching the non-financial transaction data. For example, sending the financial transaction data and the non-financial transaction data in the same batch mitigates matching issues, thereby reducing errors.

Enhanced Authorization Implementations

The payment processing systems described previously were employed to handle transactions involving the purchase of products or services and the payment for those purchases. As such the data for each transaction originated at the merchant where the purchase occurred, however the same payment processing systems can provide enhanced authorization functions that originate at other components of the system, e.g. the acquirer or the issuer financial institution. These enhanced authorization functions give merchants and issuers, for example, greater flexibility in providing services to the consumer, while providing the same benefits as standard financial transactions that are processed through the payment processing system. Those benefits include assured payment to merchants, transaction data security, and application of business rules.

Enhanced authorization functions can include: credit vouchers; payment transactions that clear and settle and support alternative routing capability; force capture—providing an advice notification of previous authorization; balance transfer from one payment card to another payment card; and renewal of a payment card, i.e., extending the expiration date. Enhanced authorization functions can also define messages that carry information between parties through the payment processing system for applying for a credit account, checking the status of a credit account application, and looking up data for an existing account, for example. Enhanced authorization functions enable any transaction program or product to support limited acceptance based on a variety of processing parameters. Such support may be applicable in authorizing, clearing and settling operations that are limited by, for example: merchant category code (e.g., code for "apparel"), transaction channel, card not present, electronic commerce, or any combination of channels, merchant identification, clearing and/or settlement message, jurisdiction as specified by the country code of the issuer, or limited to selected countries, or a combination of such limiters.

Moreover, the enhanced authorization functions may operate without requiring structural changes to the payment processing system, such as hardware, software or connection changes. For example, if the merchant already accepts credit cards associated with a transaction handler, then the merchant need not put in another communication line in order to develop a privately branded credit program. To illustrate, the Wal-Mart® store chain may wish to have a Wal-Mart® credit card program available to its consumers and is willing to give consumers using that credit card a 10% discount on all purchases at a Wal-Mart® store. The store chain is able to use the existing payment processing system that handles Visa® credit cards to implement the Wal-Mart® credit card program.

Typically, transaction authorization occurs after the consumer has presented account information, but before the merchant has relinquished the product or service being purchased, leased, or licensed. Therefore, many of the enhanced authorization functions can be implemented at the merchant's POS terminal, for example, in real time as the transaction is being consummated.

Figure 7:
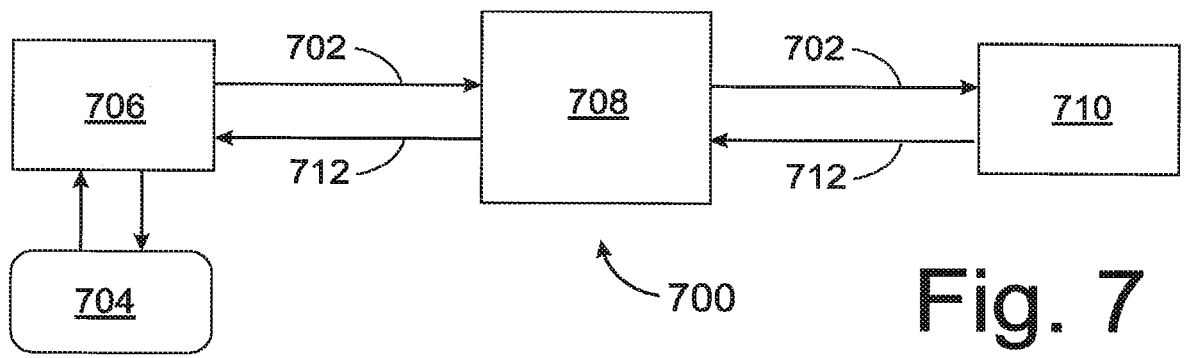
FIG. 7 illustrates an exemplary authorization flow in which a message is sent from an acquirer to a transaction expeditor, which in turn is sent to an issuer.

Referring to FIG. 7, an exemplary authorization flow in a sixth payment processing system 700 that involves an authorization message 702 being sent from an acquirer 706 to a transaction expeditor 708 (e.g., the transaction handler), which in turn sends that message 702 to an issuer 710. This process may be used prior to an actual purchase transaction to pre-qualify a customer for a purchase of an expensive product. The authorization response message 712 (e.g., the consumer has the sufficient credit to make the proposed purchase with the consumer account information provided to the merchant 704) is then relayed back through the transaction expeditor 708 to the acquirer 706 through the transaction expeditor 708.

Figure 8:
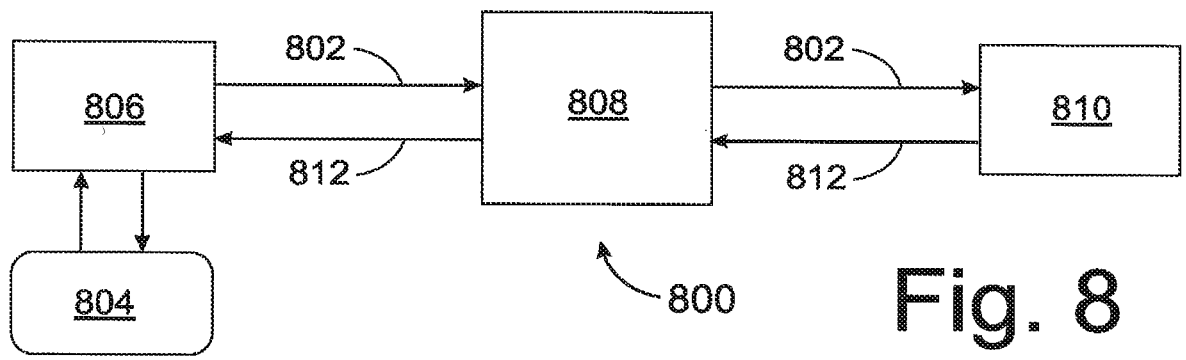
FIG. 8 depicts an exemplary authorization flow-forced capture process.

FIG. 8 depicts an exemplary authorization flow-forced capture carried out by a seventh payment processing system 800 that comprises a merchant 804, and acquirer 806 to a transaction expeditor 808 and an issuer 810. In this case, rather than requesting authorization from the issuer 810, the merchant 804 (or the acquirer 806) seeks credit risk data about a consumer prior to charging the consumer's credit card. An advice request message 802, such as for the credit risk data, for example, is transmitted through the transaction expeditor 808 to the issuer 810. In response, the issuer can return an advice response 812 through the same communication path, i.e., to the acquirer via the transaction expeditor 808, to the acquirer 806 which the notifies the merchant to accept or decline the credit transaction.

Figure 9:
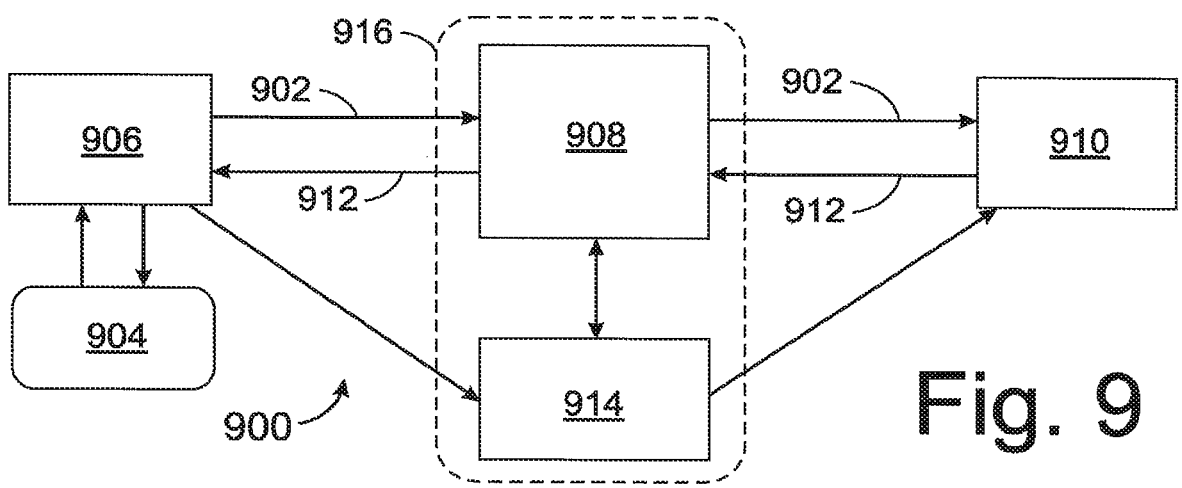
FIG. 9 shows processing of an exemplary payment transaction.

Referring to FIG. 9, the enhanced authorization functions also enable the use of new payment transaction processing codes and alternative message routing by an eighth payment processing system 900. Note that payment authorization messages 902 are sent from the acquirer 906 to transaction expeditor 908 and the to the issuer 910. A response 912 is sent by the issuer 910 to transaction expeditor 908 which relays the response to the acquirer 906. Transmissions between a clearing/settlement agent 914 and the transaction expeditor 908 occur. The transaction expeditor 908 and the clearing/settlement agent 914 may be part of a transaction expeditor 916 or they may be separate entities.

Figure 10:
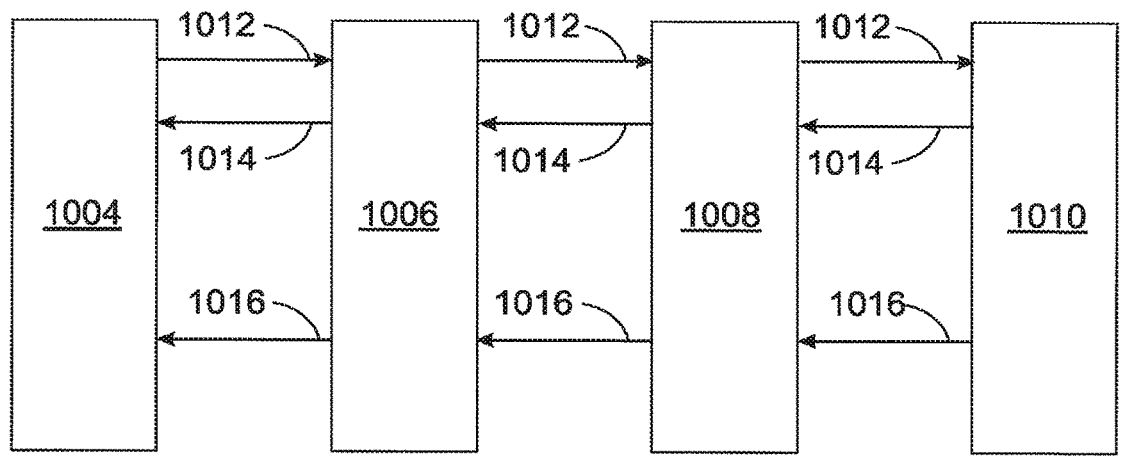
FIG. 10 is an exemplary instant payment card application process utilizing the authorization structure within the payment processing system.

FIG. 10 illustrates an exemplary application process for a portable payment device, wherein the application process utilizes the existing authorization structure of a ninth payment processing system 1000. Now, a merchant 1004 is able to obtain instant approval for a consumer to be issued an account for a portable payment device, such as a privately branded credit card, such as a Wal-Mart® credit card or co-branded Wal-Mart®-Wells Fargo® Bank Visa® credit card. The first payment processing system 100, for example, that is configured to process Visa® credit card transactions, also can support the Wal-Mart® store credit card by maintaining transaction records, producing statements, clearing and settling transactions made using that latter type of credit card.

As an example of the enhanced application process for a portable payment device, a consumer first fills out a credit application for a Wal-Mart® branded Visa credit card at a Wal-Mart® store. Then the store, acting as the merchant 1004, forms a message requesting approval of the consumer's credit card application. A request message 1012, containing the application information, is sent via the ninth payment processing system 1000 from the merchant 1004 through the acquirer 1006 and transaction expeditor 1008 to an issuer 1010. The issuer 1010 replies immediately with an application request confirmation message 1014 that is sent back through the ninth payment processing system 1000 to the merchant 1004. Depending on whether an evaluation of the credit card application determines that the consumer is or is not credit worthy, the issuer 1010 sends a decision message 1016 through the ninth payment processing system 1000 to the merchant 1004, either approving or declining issuance of a Visa credit card. The application request confirmation message 1014 and the decision message 1016 may be in one transmission or they may be sent separately depending upon how quickly the evaluation occurs.

Other features that can support the Wal-Mart® store credit card include: the routing of the application request, the application request confirmation, the application approval, or a combination thereof may be fixed on the primary account number of the Wal-Mart® credit card. The transaction messages involving the Wal-Mart® credit card may have new field tag length value formats to support optional data elements (e.g., Wal-Mart® specific promotion codes).

Figure 11:
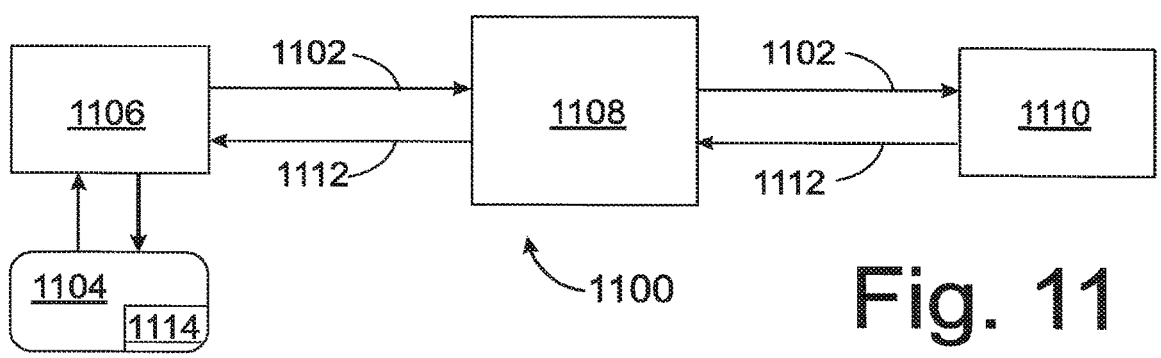
FIG. 11 shows an exemplary procedure for a merchant or acquirer to obtain account information from an account issuer via the payment processing system.

Referring to FIG. 11, the enhanced features also include use of a tenth payment processing system 1100 by a merchant 1104 to obtain information related to a consumer's payment device account. The acquirer 1106 form a message 1102 for transmission via the transaction expeditor 1108 to the issuer 1110 seeking data regarding a consumer's account. In return, the issuer 1110 places the requested information in lookup response message 1112 that is sent back through the ninth payment processing system 1100 to the acquirer 1106.

For example, a consumer with a Wells Fargo® Bank credit card may wish to make a purchase at Nordstrom® store; however, the consumer has left her credit card at home. The consumer asks that the merchant 1104 to look up her Wells Fargo® credit card account number. The merchant 1104 may submit a request message using the merchant's POS 1114 to the acquirer 1106 seeking the consumer's Wells Fargo® credit card account number. The request message includes the consumer's personal identification data, such as the her name, address, phone number, social security number, driver's license number, or a combination of the foregoing. The issuer 1110, the Wells Fargo® Bank uses the consumer's personal identification data to locate the respective account number, which then is transmitted to the merchant so that the consumer may make a purchase using that credit card account.

The POS transaction message format may have to be modified to facilitate this function. For example, routing may be based on fixed card values; the new data element for the consumer personal identification data (e.g., social security number) may have to be introduced in the request message (e.g., the transaction message may have a field that can be populated with the consumer's social security number). The formatting may assist in matching the consumer account information with the consumer personal identification data.

It may be desirable that the data elements not be logged for security purposes. For example, the consumer's social security number may not be logged to prevent the consumer's exposure to fraud.

FIG. 12 is a chart of data used by an exemplary limited acceptance function. Accounts within the payment processing system may have features that limit the scope of their utility. For example, a given credit card account may only be used at stores in a given category, a specific merchant or chain of stores, or within a single country or governmental subdivision of a country.

Example 1: the credit card for the account in the first row of the chart can only be used with merchants within the defined merchandise category, which may specify a corporate credit card that can only be used with office equipment merchants (category code 5542). The limitation can even be merchant specific, e.g., usable only at Staples® office equipment stores (merchant identification code 11111) within the United States and Canada (jurisdiction codes 840 and 124, respectively). The merchant specificity can extend to other stores that are commonly owned by the same parent corporation, such as an account that can only be used at Old Navy® retail stores, Gap® retail stores, and Banana Republic® retail stores operated by Gap Inc.

Example 2: the second row in the chart of FIG. 12 shows an account for which usage is limited to face-to-face payment transactions with a specific merchant. Consequently, for example, a consumer can not use that account to make purchases via the Internet.

Example 3: the third row denotes an account for which usage is limited to a specific merchant in the United States—such as all Dairy Queen® franchisees (merchant identification code 12513, jurisdiction code 840).

During the authorization phase of a transaction, the usage scope of the consumer account can be checked to determine if the transaction should be authorized or not. The limitations can be part of payment processing business rule that is implemented during the authorization phase.

Parameters applicable to the business rule may have to be passed from the merchant in a transmission to an entity within the payment processing system. For example, the merchant identifier code, a jurisdiction code, a channel code, and the like may have to populate a field in the authorization message.

Seventh Implementation

The seventh implementation of the present transaction processing concept includes each plausible combination of the first, second, third, fourth, fifth, and sixth implementations—as will be understood by those of skill in the relevant arts.

In a first example, a consumer walks into a merchant's store with a Chase® Bank VISA® credit card and buys a product listed in a promotional flyer stating that use of a Chase® Bank VISA® credit card to buy that product will result in a 10% price discount. A credit of 10% of the purchase value for that product is applied to the consumer's Chase® Bank VISA® credit card account. In a second example, a consumer leaves his Chase® Bank VISA® credit card at home, but wishes to purchase the product mentioned in a promotional flyer and still receive "the 10% price discount. The merchant utilizes the enhanced authorization functionality by looking up the consumer's Chase® Bank VISA® credit card number and conducts the transaction. A credit of 10% of the purchase value for the product with the SKU number is applied to the consumer's Chase® Bank VISA® credit card account. In a third example, a consumer does not have a Chase® Bank VISA® credit card, but wishes to apply for one in order to buy the promotional product at a 10% discount. The merchant utilizes the enhanced authorization functionality to apply for assist in facilitating the issuance to the consumer of a Chase® Bank VISA® credit card account. The credit card account then is used to purchase the promotional product. A credit of 10% of the purchase value for the product is applied to the consumer's newly opened Chase® Bank VISA® credit card account.

The steps of a method, process, or algorithm described in connection with the implementations disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed implementations is provided to enable any person of ordinary skill in the art to make or use the disclosure. Various modifications to these implementations will be readily apparent to those of ordinary skill in the art, and the generic principles defined herein may be applied to other implementations without departing from the spirit or scope of the disclosure. Thus, the disclosure is not intended to be limited to the implementations shown herein but is to be accorded the widest scope consistent with the principles and novel features disclosed herein.

The invention claimed is:

1. A method for processing non-financial transaction data related to a product purchase incentive program, comprising:
   processing, by at least one hardware processor of a transaction handler, a financial transaction between a consumer and a merchant;
   receiving, by the at least one hardware processor of the transaction handler and in real-time during the financial transaction, a first message from a computing device of the merchant, the first message comprising financial transaction data associated with the financial transaction involving a purchase of an item by the consumer from the merchant, wherein the financial transaction data associated with the financial transaction comprises an account identifier of an account of the consumer, wherein the account of the consumer is provided by an issuer;
   receiving, by the at least one hardware processor of the transaction handler, a second message from the computing device of the merchant and in real-time during the financial transaction, the second message comprising the account identifier of the account of the consumer and non-financial transaction data;
   wherein the at least one hardware processor of the transaction handler receives the first message and the second message separately;
   wherein the first message and the second message are received prior to an approval of authorization of the financial transaction associated with the purchase of the item by the issuer;
   transmitting, by the at least one hardware processor of the transaction handler and in real-time during the financial transaction, the account identifier of the account of the consumer and the non-financial transaction data to at least one hardware processor of a qualifier based on receiving the second message from the computing device of the merchant;
   transmitting, by the at least one hardware processor of the transaction handler and in real-time during the financial transaction, the account identifier of the account of the consumer and the financial transaction data associated with the financial transaction to the at least one hardware processor of the qualifier based on receiving the second message from the computing device of the merchant;
   determining, by the at least one hardware processor of the qualifier, that the financial transaction data associated with the financial transaction and the non-financial transaction data correspond to the financial transaction, wherein determining whether the financial transaction data associated with the financial transaction and the non-financial transaction data correspond comprises:
      determining, by the at least one hardware process of the qualifier, that the financial transaction data associated with the financial transaction corresponds to the non-financial transaction data based on the account identifier of the account of the consumer;
   applying, by the at least one hardware processor of the qualifier, product purchase incentive program rules for the product purchase incentive program to the non-financial transaction data based on determining that the financial transaction data in the first message and the non-financial transaction data in the second message correspond based on the account identifier of the account of the consumer;
   determining, by the at least one hardware processor of the qualifier, whether the consumer is entitled to a reward under the product purchase incentive program based on the product purchase incentive program rules;
   transmitting, by the at least one hardware processor of the qualifier and in real-time during the financial transaction, an indication that the consumer is entitled to the reward under the product purchase incentive program to at least one hardware processor of the issuer;
   transmitting, by the at least one hardware processor of the transaction handler and in real-time during the financial transaction, an authorization request message comprising the financial transaction data associated with the financial transaction involving the purchase of the item by the consumer to the at least one hardware processor of the issuer for authorization of the financial transaction by the issuer;
   receiving, by the at least one hardware processor of the transaction handler, an authorization response message from the at least one hardware processor of the issuer, wherein the authorization response message indicates authorization of the financial transaction by the issuer; and
   sending, by the at least one hardware processor of the transaction handler, an electronic message to the computing device of the merchant, the electronic message to cause the computing device of the merchant to provide the reward to the account of the consumer.

2. The method of claim 1, further comprising:
   determining a transaction processor associated with the issuer based on the account identifier of the account of the consumer; and
   sending the first message and the second message to the transaction processor associated with the issuer.

3. The method of claim 1, wherein determining whether the consumer is entitled to the reward under the product purchase incentive program further comprises:
    determining that the account of the consumer is eligible to participate in the product purchase incentive program based on account holder data associated with the account of the consumer, merchant data associated with the merchant, and the product purchase incentive program rules.

4. The method of claim 1, further comprising:
    sending an electronic incentive program processing message to the computing device of the merchant and to the issuer based on determining that the consumer is entitled to the reward under the product purchase incentive program.

5. The method of claim 1, wherein the non-financial transaction data comprises a product identifier that identifies the item, and wherein the non-financial transaction data is generated by the computing device of the merchant during processing of the financial transaction, and wherein applying the product purchase incentive program rules for the product purchase incentive program to the non-financial transaction data comprises:
    applying the product purchase incentive program rules for the product purchase incentive program to the product identifier based on determining that the financial transaction data in the first message and the non-financial transaction data in the second message correspond.

6. The method as recited in claim 1, further comprising:
    receiving, by the at least one hardware process of the qualifier, the product purchase incentive program rules for the product purchase incentive program that include a requirement to purchase the item.

7. The method as recited in claim 1, wherein a transaction identification code is generated by the computing device of the merchant, wherein the transaction identification code comprises a hashed value that identifies characteristics of the financial transaction.

8. The method as recited in claim 1, further comprising:
    receiving the financial transaction data associated with the financial transaction and the non-financial transaction data from the computing device of the merchant.

9. The method as recited in claim 8, further comprising:
    reformatting the financial transaction data associated with the financial transaction into the first message; and
    reformatting the non-financial transaction data into the second message.

10. A system for processing non-financial transaction data related to a product purchase incentive program, comprising:
    at least one hardware processor of a qualifier; and
    at least one hardware processor of a transaction handler;
    wherein the at least one hardware processor of the transaction handler is programmed or configured to:
        process a financial transaction between a consumer and a merchant;
        receive, in real-time during the financial transaction, a first message from a computing device of the merchant, the first message comprising financial transaction data associated with the financial transaction involving a purchase of an item by the consumer from the merchant, wherein the financial transaction data associated with the financial transaction comprises an account identifier of an account of the consumer, wherein the account of the consumer is provided by an issuer;
        receive, in real-time during the financial transaction, a second message from the computing device of the merchant, the second message comprising the account identifier of the account of the consumer and non-financial transaction data;
    wherein the at least one hardware processor of the transaction handler receives the first message and the second message separately;
    wherein the first message and the second message are received prior to an approval of authorization of the financial transaction associated with the purchase of the item by the issuer;
        transmit, in real-time during the financial transaction, the account identifier of the account of the consumer and the non-financial transaction data to the at least one hardware processor of the qualifier based on receiving the second message from the computing device of the merchant;
        transmit, in real-time during the financial transaction, the account identifier of the account of the consumer and the financial transaction data associated with the financial transaction to the at least one hardware processor of the qualifier based on receiving the first message from the computing device of the merchant,
    wherein the at least one hardware processor of the qualifier is programmed or configured to:
        determine that the financial transaction data associated with the financial transaction and the non-financial transaction data correspond to the financial transaction, wherein when determining whether the financial transaction data associated with the financial transaction and the non-financial transaction data correspond, the at least one hardware processor of the qualifier is programmed or configured to:
            determine that the financial transaction data associated with the financial transaction correspond to the non-financial transaction data based on the account identifier of the account of the consumer;
        apply a product purchase incentive program rule for the product purchase incentive program to the non-financial transaction data based on determining that the financial transaction data in the first message and the non-financial transaction data in the second message correspond based on the account identifier of the account of the consumer;
        determine that the consumer is entitled to a reward under the product purchase incentive program based on the product purchase incentive program rule;
        transmit, in real-time during the financial transaction, an indication that the consumer is entitled to the reward under the product purchase incentive program to the issuer,
    wherein the at least one hardware processor of the transaction handler is programmed or configured to:
        transmit, in real-time during the financial transaction, an authorization request message comprising the financial transaction data associated with the financial transaction involving the purchase of the item by the consumer to the issuer for authorization of the financial transaction;
        receive an authorization response message from the issuer, wherein the authorization response message indicates authorization of the financial transaction by the issuer; and
        send an electronic message to the computing device of the merchant, the electronic message to cause the computing device of the merchant to provide the reward to the account of the consumer.

11. The system of claim 10, wherein the electronic message causes the computing device of the merchant to provide the reward to the account of the consumer.

12. The system of claim 10, wherein the financial transaction data associated with the financial transaction comprises a transaction identification code associated with the financial transaction and the non-financial transaction data comprises the transaction identification code associated with the financial transaction and wherein, when determining that the financial transaction data associated with the financial transaction correspond to the non-financial transaction data, the at least one hardware processor of the qualifier is programmed or configured to:
   determine that the financial transaction data associated with the financial transaction in the first message and the non-financial transaction data in the second message correspond based on the transaction identification code.

13. The system of claim 10, wherein the at least one hardware processor of the qualifier is further programmed or configured to:
   receive the financial transaction data associated with the financial transaction and the non-financial transaction data from the computing device of the merchant.

14. The system of claim 13, wherein the at least one hardware processor of the qualifier is further programmed or configured to:
   reformat the financial transaction data associated with the financial transaction into the first message; and
   reformat the non-financial transaction data into the second message.

15. The system of claim 10, wherein the at least one hardware processor of the qualifier is further programmed or configured to:
   send an electronic incentive program processing message to the computing device of the merchant and to the issuer based on determining that the consumer is entitled to the reward under the product purchase incentive program.

16. The system of claim 10, wherein the at least hardware processor of the qualifier is configured to receive product purchase inventive program rules of the product purchase incentive program that include a requirement to purchase the item.

17. A computer program product for processing non-financial transaction data related to a product purchase incentive program, the computer program product comprises at least one non-transitory tangible machine readable medium storing instructions that when executed by a computer processing system, cause the computer processing system to:
   process, by at least one hardware processor of a transaction handler, a financial transaction between a consumer and a merchant;
   receive, by the at least one hardware processor of the transaction handler and in real-time during the financial transaction, a first message from a computing device of the merchant, the first message comprising financial transaction data associated with the financial transaction involving a purchase of an item by the consumer from the merchant, wherein the financial transaction data associated with the financial transaction comprises an account identifier of an account of the consumer, wherein the account of the consumer is provided by an issuer;
   receive, by the at least one hardware processor of the transaction handler and in real-time during the financial transaction, a second message from the computing device of the merchant, the second message comprising the account identifier of the account of the consumer and non-financial transaction data;
   wherein the at least one hardware processor of the transaction handler receives the first message and the second message separately;
   wherein the first message and the second message are received prior to an approval of authorization of the financial transaction associated with the purchase of the item by the issuer;
   transmit, by the at least one hardware processor of the transaction handler and in real-time during the financial transaction, the account identifier of the account of the consumer and the non-financial data to at least one hardware processor of a qualifier based on receiving the second message from the computing device of the merchant;
   transmit, by the at least one hardware processor of the transaction handler and in real-time during the financial transaction, the account identifier of the account of the consumer and the financial data associated with the financial transaction to the at least one hardware processor of the qualifier based on receiving the first message from the computing device of the merchant;
   determine, by the at least one hardware processor of the qualifier, that the financial transaction data associated with the financial transaction and the non-financial transaction data correspond to the financial transaction, wherein determining whether the financial transaction data associated with the financial transaction and the non-financial transaction data correspond comprises:
      determining, by the at least one hardware processor of the qualifier, that the financial transaction data associated with the financial transaction corresponds to the non-financial transaction data based on the account identifier of the account of the consumer;
   apply, by the at least one hardware processor of the qualifier, product purchase incentive program rules for the product purchase incentive program to the non-financial transaction data based on determining that the financial transaction data in the first message and the non-financial transaction data in the second message correspond, based on the account identifier of the account of the consumer;
   determine, by the at least one hardware processor of the qualifier, that the consumer is entitled to a reward under the product purchase incentive program based on the product purchase incentive program rules;
   transmit, by the at least one hardware processor of the qualifier and in real-time during the financial transaction, an indication that the consumer is entitled to the reward under the product purchase incentive program to at least one hardware processor of the issuer;
   transmit, by the at least one hardware processor of the transaction handler and in real-time during the financial transaction, an authorization request message comprising the financial transaction data associated with the financial transaction involving the purchase of the item by the consumer to the at least one hardware processor of the issuer for authorization of the financial transaction by the issuer;
   receive, by the at least one hardware processor of the transaction handler, an authorization response message from the at least one hardware processor of the issuer, wherein the authorization response message indicates authorization of the financial transaction by the issuer; and send, by the at least one hardware processor of the transaction handler, an electronic message to the computing device of the merchant, the electronic message to cause the computing device of the merchant to provide the reward to the account of the consumer.

18. The computer program product of claim 17, wherein the instructions further cause the computer processing system to:

receive the financial transaction data associated with the financial transaction and the non-financial transaction data from the computing device of the merchant.

19. The computer program product of claim 18, wherein the instructions further cause the computer processing system to:

reformat the financial transaction data associated with the financial transaction into the first message; and reformat the non-financial transaction data into the second message.

* * * * *